March 6, 1962  E. T. WHEELER  3,023,687
VENTING FASTENERS FOR ATTACHING SHEATHING TO HOLLOW WALLS
Filed March 7, 1960
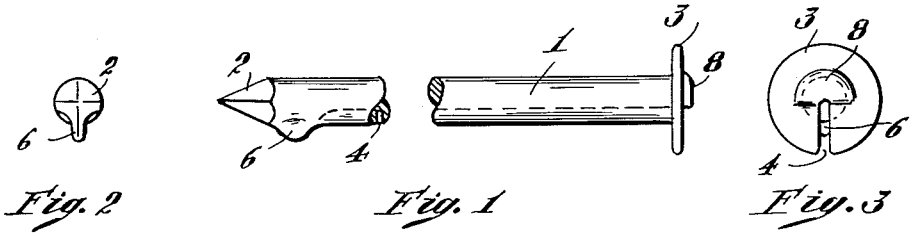
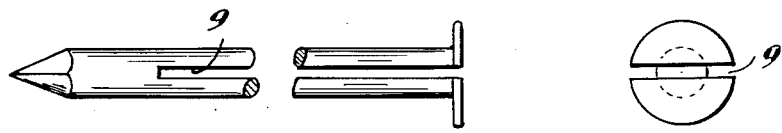
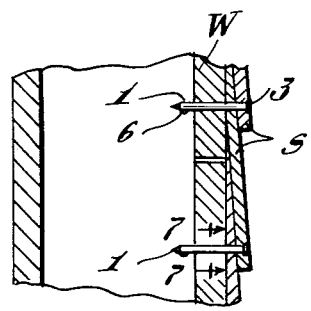
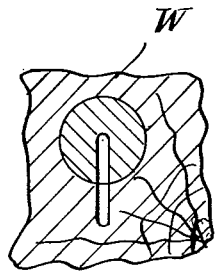
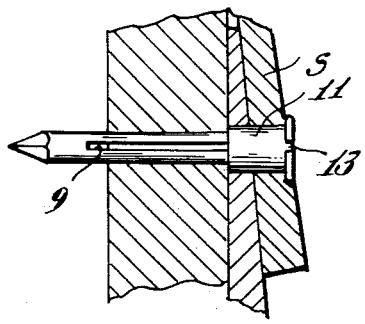
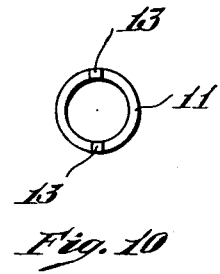
Inventor
Everett T. Wheeler
by Roberts, Cushman & Grover
Att'ys

United States Patent Office 3,023,687
Patented Mar. 6, 1962

3,023,687
VENTING FASTENERS FOR ATTACHING SHEATHING TO HOLLOW WALLS
Everett T. Wheeler, Melrose, Mass.
(293 Mount Vernon St., Lawrence, Mass.)
Filed Mar. 7, 1960, Ser. No. 13,166
13 Claims. (Cl. 98—31)

As is well known much damage results from trapped condensed moisture vapor collecting in hollow walls, particularly in the case of frame buildings with wood weather-boarding. Many ways have been devised to avoid this trouble but they have been either ineffective or too expensive.

Objects of the present invention are to provide a simple and effective way of venting hollow or insulated walls and to provide a fastener for attaching weather-boarding which also serves as a vent, thus tending to eliminate rotted sills, studs, sheathing boards and peeling paint caused by condensed moisture vapor.

According to the present invention the fastener comprises a shank adapted to extend through the weather-boarding into the hollow wall and a head adapted to seat on the outside of the weather-boarding, the fastener having a channel extending lengthwise through the shank and head and opening to one side of the shank from the head to a location near the other end of the fastener to afford a vent from the interior of the hollow wall to the atmosphere along one side of the shank. While the channel may extend all the way to the pointed end of the fastener, preferably it stops somewhat short of the point. While the channel may comprise a slot extending all the way through the shank from side to side, preferably it comprises a groove opening on one or more sides of the shank. The fastener has a point on one end of the shank so that it can be driven through the weather-boarding without first drilling a hole. While the fastener may be in the form of a screw, it is preferably a nail which may have a protuberance acting as a router at the aforesaid location to cut a groove in the weather-boarding and wall opposite the aforesaid channel when the nail is driven, thereby to augment the ventilation.

In a more specific aspect the fastener may comprise a collar fitting around the shank under the head to keep the channel from expanding, the collar preferably having a protuberance which fits into the channel in the head to keep the channel from contracting. In the preferred embodiment the collar approximates the thickness of the sheathing and weather-boarding to protect the sheathing and weather-boarding from moisture.

For the purpose of illustration typical embodiments are shown in the accompanying drawings in which:

FIG. 1 is a side elevation of one embodiment;
FIGS. 2 and 3 are end elevations of the embodiment shown in FIG. 1;
FIG. 4 is a side view of a modification;
FIG. 5 is an end view of the modification shown in FIG. 4;
FIG. 6 is a section through a wall having the weather-boarding attached with fasteners of the kind shown in FIGS. 1 to 3;
FIG. 7 is a section on line 7—7 of FIG. 6;
FIG. 8 is a section like FIG. 6 showing a modification;
FIG. 9 is a side elevation of one of the aforesaid collars; and
FIG. 10 is an end elevation of the collar.

The particular embodiment of the invention shown in FIGS. 1 to 3 comprises a nail having a shank 1, a point 2 and a head 3. Extending lengthwise along one side of the nail is a channel 4 which extends continuously from the location 5 near the pointed end of the nail to and through the head. Disposed between the pointed end of the nail and the end 5 of the channel is a protuberance or router 6 which is located in alignment with the channel and has approximately the same width. Thus when the nail is driven the protuberance 6 cuts a channel 7 in the weather-boarding S and wall W, thereby augmenting the ventilation afforded by the channel 4. As shown in FIG. 6 the length of the nail should be such that the channel 4 connects the interior of the wall with the atmosphere. The head of the nail may have a protuberance or brow 8 overhanging the outer end of the channel to minimize the tendency for rain to enter the channel or clog when painting.

In the modification shown in FIGS. 4 and 5 the channel is in the form of a slot 9 which extends all the way through the shank and head from side to side.

The embodiment shown in FIGS. 8, 9 and 10 comprises a collar 11 fitting around the shank of the fastener adjacent its head to keep the slot 9 from expanding. On the outer end of the collar are protuberances 13 which fit into the slot in the fastener head to keep the slot from closing as the fastener is inserted. As shown in FIG. 8 the collar preferably extends through the weather-boarding S so as to protect the weather-boarding from moisture.

This application is a continuation-in-part of application Ser. No. 841,224, filed September 21, 1959, now abandoned.

It should be understood that the present disclosure is for the purpose of illustration only and that this invention includes all modifications and equivalents which fall within the scope of the appended claims.

I claim:
1. For fastening weather-boarding to a hollow wall, an elongate fastener comprising a shank adapted to extend through the weather-boarding into the hollow wall and a head adapted to seat on the outside of the weather-boarding, the fastener having a channel extending lengthwise of the shank and head and opening to one or more sides of the shank from the head to a location at the other end of the fastener to afford a vent from the interior of the hollow wall to the atmosphere along one or more sides of the shank, said channel extending substantially the full length of the fastener.

2. A fastener according to claim 1 wherein the channel is in the form of a groove on one or more sides of the shank.

3. A fastener according to claim 1 wherein the channel is in the form of a slot extending through the shank and head from side to side.

4. For fastening weather-boarding to a hollow wall, an elongate fastener comprising a shank adapted to extend through the weather-boarding into the hollow wall with a point on one end and a head on the other end adapted to seat on the outside of the weather-boarding, the fastener having a channel extending continuously lengthwise of the shank and head and opening to one side of the shank from the head to a location near said point to afford a vent from the interior of the hollow wall to the atmosphere along one side of the shank.

5. For fastening weather-boarding to a hollow wall, a nail comprising a shank adapted to extend through the weather-boarding into the hollow wall with a point on one end and a head on the other end adapted to seat on the outside of the weather-boarding, the nail having a channel extending lengthwise of the shank and head and opening to one side of the shank from the head to a location near said point to afford a vent from the interior of the hollow wall to the atmosphere along one side of the shank, and a protuberance at said location to cut a groove in the weather-boarding and wall opposite said channel when the nail is driven, thereby to augment the ventilation.

6. A nail according to claim 5 wherein the channel comprises a groove on one side of the shank.

7. A nail according to claim 5 wherein the channel comprises a slot extending through the shank from side to side.

8. A fastener according to claim 1 wherein said head has a protuberance or brow overhanging the outer end of the channel.

9. For fastening weather-boarding to a hollow wall, an elongate fastener comprising a shank adapted to extend through the weather-boarding into the hollow wall and a head adapted to seat outside the weather-boarding, the fastener having a channel extending lengthwise of the shank and head to afford a vent from the interior of the hollow wall to the atmosphere along one or more sides of the shank, and a collar fitting around the shank under the head to keep the channel from expanding.

10. A fastener according to claim 9, further characterized in that the collar has a protuberance on one end which fits into the channel in the head to keep the channel from contracting.

11. A fastener according to claim 9 wherein the length of the collar approximates the thickness of the weather-boarding to protect the weather-boarding from moisture.

12. For fastening weather-boarding to a hollow wall, an elongate fastener comprising a shank adapted to extend through the weather-boarding into the hollow wall and a head adapted to seat outside the weather-boarding, the fastener having a slot extending lengthwise of the shank and head to afford a vent from the interior of the hollow wall to the atmosphere along two sides of the shank, and a collar fitting around the shank under the head to keep the slot from expanding, the collar having protuberances on one end which fit into the slot in the head at each side of the shank.

13. A fastener according to claim 4 further characterized in that said channel stops short of said point.

References Cited in the file of this patent

UNITED STATES PATENTS

| | | |
|---|---|---|
| 2,353,386 | Bourcier | July 11, 1944 |
| 2,705,030 | Koffler et al. | Mar. 29, 1955 |
| 2,840,867 | Wilder | July 1, 1958 |